(12) United States Patent
Huang et al.

(10) Patent No.: US 10,981,351 B2
(45) Date of Patent: Apr. 20, 2021

(54) COMPOSITE CLOTH

(71) Applicants: Chen-Cheng Huang, Taipei (TW); Pao-Han Huang, Taipei (TW); Pao-Hao Huang, Taipei (TW)

(72) Inventors: Chen-Cheng Huang, Taipei (TW); Pao-Han Huang, Taipei (TW); Pao-Hao Huang, Taipei (TW)

( * ) Notice: Subject to any disclaimer, the term of this patent is extended or adjusted under 35 U.S.C. 154(b) by 0 days.

(21) Appl. No.: 16/268,598

(22) Filed: Feb. 6, 2019

(65) Prior Publication Data

US 2019/0248101 A1     Aug. 15, 2019

(30) Foreign Application Priority Data

Feb. 14, 2018 (TW) .................................. 107105537

(51) Int. Cl.
     *B32B 3/26*     (2006.01)
     *B32B 5/02*     (2006.01)
     *B32B 27/12*     (2006.01)

(52) U.S. Cl.
     CPC .............. *B32B 3/266* (2013.01); *B32B 5/022* (2013.01); *B32B 5/024* (2013.01); *B32B 27/12* (2013.01)

(58) Field of Classification Search
     CPC ......... B32B 3/266; B32B 5/024; B32B 5/022; B32B 27/12; B32B 27/32; B32B 27/36; B32B 33/00; B32B 2437/00
     See application file for complete search history.

(56) References Cited

U.S. PATENT DOCUMENTS

| | | | |
|---|---|---|---|
| 2014/0363625 A1 * | 12/2014 | Huang | B32B 3/30 |
| | | | 428/133 |
| 2018/0022063 A1 * | 1/2018 | Berrang | B32B 3/30 |
| | | | 442/224 |
| 2019/0009496 A1 * | 1/2019 | Trouba | B32B 7/12 |

* cited by examiner

*Primary Examiner* — Michael Zhang
(74) *Attorney, Agent, or Firm* — Hamre, Schumann, Mueller & Larson, P.C.

(57) ABSTRACT

A composite cloth includes a fabric sheet and a film unit. The fabric sheet has bottom and top surfaces and a plurality of micropores extending through the bottom and top surfaces. The film unit includes bottom and top cover films respectively disposed on the bottom and top surfaces of the fabric sheet. Each of the first and second cover films includes opposite film bottom and top surfaces, and a plurality of film sections connected to each other. Each of the film section includes a pair of longitudinal trough portions, a pair of transverse trough portions connected between the longitudinal trough portions, and a crest portion surrounded by and protruding from the longitudinal and transverse trough portions.

18 Claims, 6 Drawing Sheets

COMPOSITE CLOTH

CROSS-REFERENCE TO RELATED APPLICATION

This application claims priority of Taiwanese Invention Patent Application No. 107105537, filed on Feb. 14, 2018.

FIELD

The disclosure relates to a composite cloth, and more particularly to a composite cloth formed with a plurality of air accommodating spaces.

BACKGROUND

Conventional monolayer fabrics, such as woven fabrics composed of interlaced warp and weft yarns, have a plurality of pores among the warp and weft yarns. Since air freely permeates through the pores, the conventional monolayer fabrics have a poor warmth retention property. For fulfilling consumers' requirements for clothing that provides warmth, a multi-layered fabric made by stacking a plurality of the monolayer fabrics are proposed, in which pores of one of the monolayer fabrics are misaligned with pores of the adjacent monolayer fabrics. By way of misaligned arrangement of the pores of the monolayer fabrics, air permeation through the pores of the multi-layered fabric is hindered. However, this multi-layered fabric has problems such as excessive thickness, excessive weight, and poor softness, which need to be overcome.

SUMMARY

Therefore, an object of the disclosure is to provide a composite cloth that can alleviate at least one of the drawbacks of the prior art.

According to the disclosure, the composite cloth includes a fabric sheet and a film unit.

The fabric sheet has a bottom surface, a top surface opposite to the bottom surface, and a plurality of micropores extending through the bottom surface and the top surface.

The film unit includes first and second cover films disposed on the bottom and top surfaces of the fabric sheet, respectively. Each of the first and second cover films includes a film bottom surface, a film top surface opposite to the film bottom surface and a plurality of film sections connected to each other and cooperatively defining the film bottom and top surfaces. Each of the film section includes a pair of longitudinal trough portions, a pair of transverse trough portions connected between the longitudinal trough portions, and a crest portion surrounded by and protruding from the longitudinal and transverse trough portions along a direction (D1) from the film bottom surface to the film top surface of a corresponding one of the first and second cover films. The longitudinal and transverse trough portions and the crest portions cooperatively define air accommodating spaces that are spaced apart from the fabric sheet.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
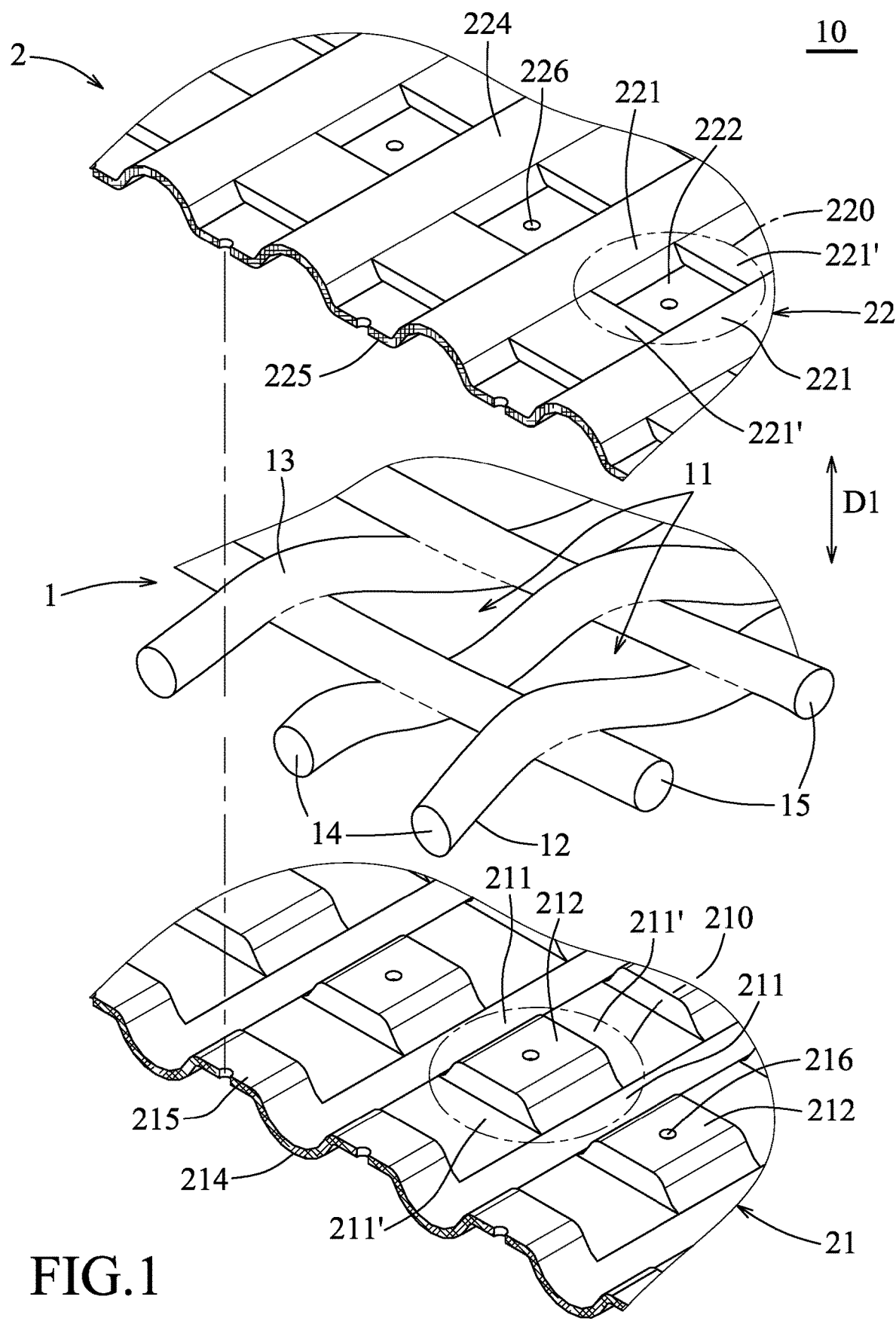
FIG. 1 is a fragmentary exploded view illustrating a first embodiment of a composite cloth according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
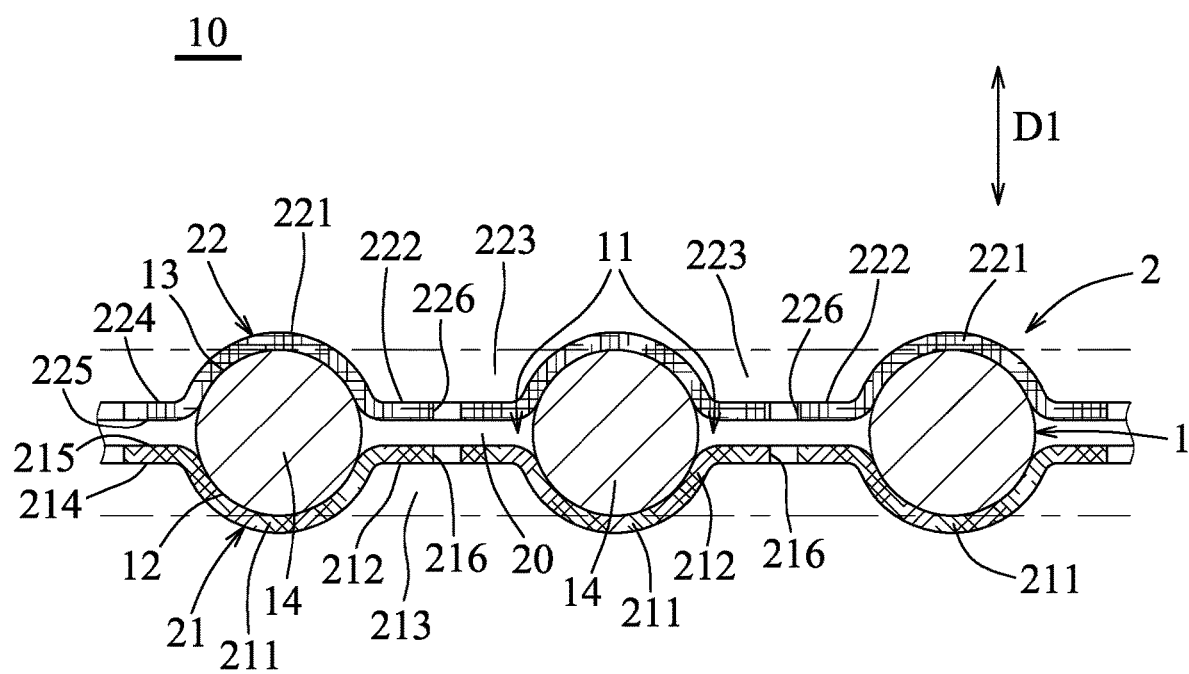
FIG. 2 is a fragmentary cross-sectional view illustrating the first embodiment.

Referring to FIGS. 1 and 2, a first embodiment of a composite cloth 10 according to the disclosure includes a fabric sheet 1 and a film unit 2.

The fabric sheet 1 has a bottom surface 12, a top surface 13 opposite to the bottom surface 12, and a plurality of micropores 11 extending through the bottom surface 12 and the top surface 13. The fabric sheet 1 may be made of one of a woven fabric and a nonwoven fabric. In the embodiment, the fabric sheet 1 is made of the woven fabric and includes a plurality of warp yarns 14 and a plurality of weft yarns 15 interlaced with each other to define the micropores 11 thereamong. In one form, the fabric sheet 1 may have a multilayered structure.

The film unit 2 includes a first cover film 21 disposed on the bottom surface 12 of the fabric sheet 1 and a second cover film 22 disposed on the top surface 13 of the fabric sheet 1. Each of the first and second cover films 21, 22 includes a film bottom surface 214, 224, a film top surface 215, 225 opposite to the film bottom surface 214, 224 and a plurality of film sections 210, 220 connected to each other and cooperatively defining the film bottom surface 214, 224 and the film top surface 215, 225. Each of the film sections 210, 220 includes a pair of longitudinal trough portions 211, 221, a pair of transverse trough portions 211', 221' connected between the longitudinal trough portions 211, 221, and a crest portion 212, 222 surrounded by and protruding from the longitudinal and transverse trough portions 211, 221; 211', 221' along a direction (D1) from the film bottom surface 214, 224 to the film top surface 215, 225 of a corresponding one of the first and second cover films 21, 22. The longitudinal and transverse trough portions 211, 221; 211', 221' and the crest portions 212, 222 of the film sections 210, 220 cooperatively define air accommodating spaces 213, 223 that are spaced apart from the fabric sheet 1. The first cover film 21 and the second cover film 22 of the film unit 2 may be made of a thermoplastic material that is selected from polyolefin, polyester, and a thermoplastic elastomer. For example, the first cover film 21 and the second cover film 22 of the film unit 2 may be made of polyurethane elastomer.

In this embodiment, the film top surface 215 of the first cover film 21 is connected to the bottom surface 12 of the fabric sheet 1. The crest portion 212 of each of the film sections 210 of the first cover film 21 extends into a corresponding one of the micropores 11. The air accommodating spaces 213 of the first cover film 21 are respectively received in the micropores 11. The film top surface 225 of the second cover film 22 is connected to the top surface 13 of the fabric sheet 1. The crest portion 222 of each of the film sections 220 of the second cover film 22 extends into a corresponding one of the micropores 11. The air-accommodating spaces 223 of the second cover film 22 are respectively received in the micropores 11.

In one form, a corresponding one of the crest portions 212 of the film sections 210 of the first cover film 21 and a corresponding one of the crest portions 222 of the film sections 220 of the second cover film 22, both of which extend into a same one of the micropores 11, cooperate with the fabric sheet 1 to define an air retaining chamber 20 in the same micropore 11. The air retaining chamber 20 as defined is spaced apart from corresponding ones of the air accommodating spaces 213, 223 of the first and second films 21, 22 received in the same micropore 11.

In one form, each of the longitudinal and transverse trough portions 211, 211' and the crest portions 212 of each of the film sections 210 of the first cover film 21 and each of the longitudinal and transverse trough portions 221, 221' and the crest portions 222 of each of the film sections 220 of the second cover film 22 may have a cross section extending transverse to the direction (D1) and shaped into one of a tetragon and a semicircle.

With inclusion of the first and second cover films 21, 22 and formation of the air accommodating spaces 213, 223 and the air retaining chamber 20 in the micropores 11, warm air present in a space between a clothing and a wearer's body, or cold air in the environment outside the clothing, is hindered from smoothly flowing through the micropores 11 of the fabric sheet 1 when the wearer puts on the clothing made of the composite cloth 10 of this disclosure. Hence, the clothing made of the composite cloth 10 of this disclosure has desirable lightweight and warmth properties without a significant increase in thickness and weight. In addition, the fabric sheet 1 of the composite cloth 10 of this disclosure is configured to be mono-layered so as to allow the clothing made therefrom to have an improved softness without being bulky.

In one form, at least one of the corresponding crest portions 212, 222 of the film sections 210, 220 of the first and second cover films 21, 22 is formed with a through hole 216, 226 that has a pore size smaller than that of the same micropore 11 and that is in gas communication with the air retaining chamber 20 in the same micropore 11. In this embodiment, each of the corresponding crest portions 212, 222 of the film sections 210, 220 of the first and second cover films 21, 22 is formed with the through holes 216, 226. In another form, each of the crest portions 212, 222 of the film sections 210, 220 of the first and second cover films 21, 22 may be free of the through holes 216, 226.

The composite cloth 10 of the disclosure may be manufactured using a vacuum forming process with the following steps. First, a raw first cover film is disposed on the bottom surface 12 of the fabric sheet 1. Then, the raw first cover film and the fabric sheet 1 are placed together over a mold (not shown in the figures) and the raw first cover film is heated and softened. Next, a suction force is applied to the softened raw first cover film to form the film sections 210 using the vacuum forming process so as to form the first cover film 21 and to melt-bond the first cover film 21 to the fabric sheet 1. Then, a semi-product of the fabric sheet 1 bonded with the first cover f 21 is cooled and released from the mold. Next, a raw second cover film is placed on the second surface 13 of the fabric sheet 1 and the abovementioned steps for conducting the vacuum forming process are repeated to form the film sections 220 of the second cover film 22 and to melt-bond the second cover film 22 to the fabric sheet 1. Finally, the composite cloth 10 formed with the first and second cover films 21, 22, each of which includes the film sections 210, 220, is obtained.

Figure 3:
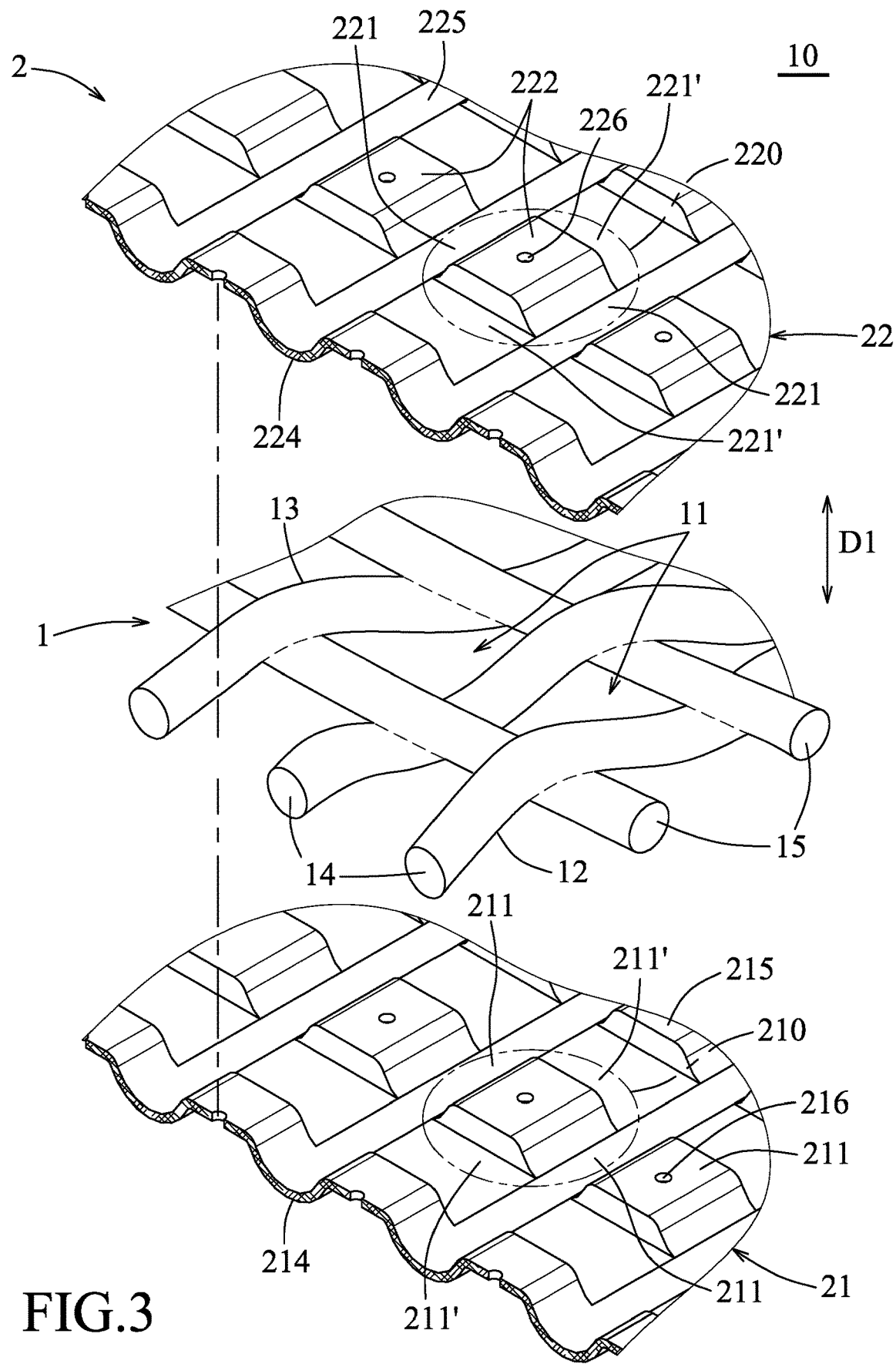
FIG. 3 is fragmentary exploded view illustrating a second embodiment of the composite cloth according to the disclosure.
Figure 4:
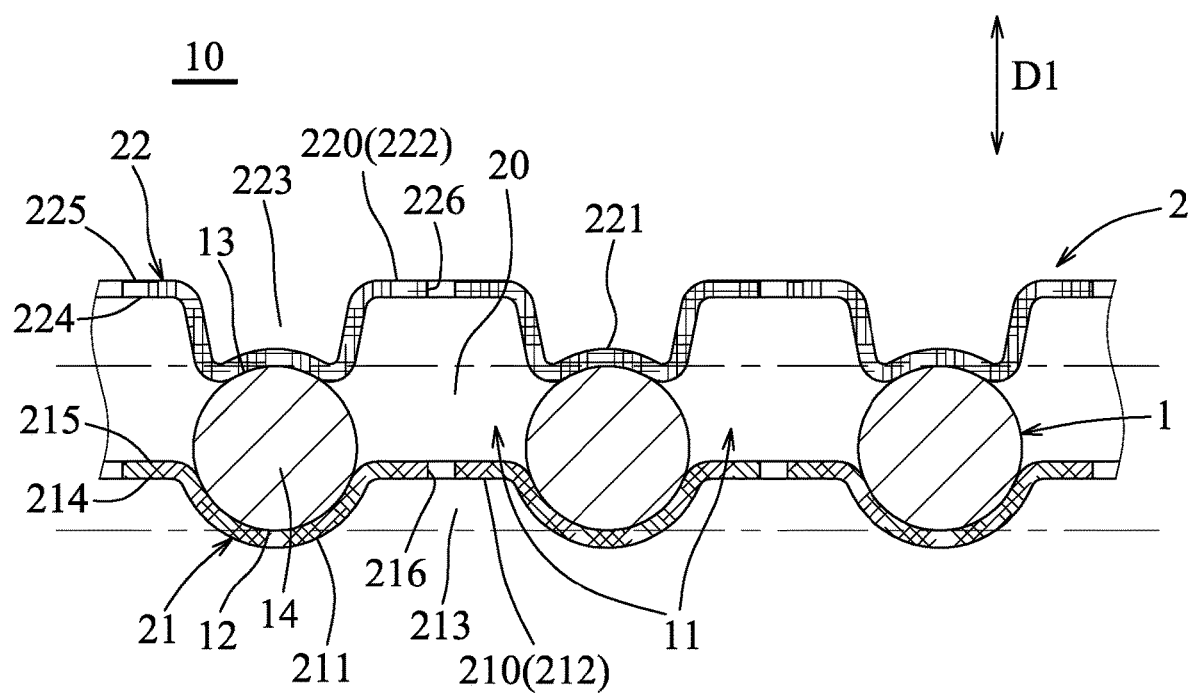
FIG. 4 is a fragmentary cross-sectional view illustrating the second embodiment.

Referring to FIGS. 3 and 4, a second embodiment of the composite cloth 10 according to the disclosure is illustrated. The fabric sheet 1 and the film unit 2 of the composite cloth 10 of the second embodiment have a configuration similar to that of the first embodiment. However, in the second embodiment, the film bottom surface 224 of the second cover film 22 is connected to the top surface 13 of the fabric sheet 1. The crest portion 222 of each of the film sections 220 of the second cover film 22 protrudes away from the top surface 13 of the fabric sheet 1 and corresponds in position to one of the micropores 11. The air accommodating spaces 223 of the second cover film 22 are respectively misaligned with the micropores 11.

Specifically, a corresponding one of the crest portions 212 of the film sections 210 of the first cover film 21 and a corresponding one of the crest portions 222 of the film sections 220 of the second cover film 22, which correspond in position to a same one of the micropores 11, cooperate with the fabric sheet 1 to define an air retaining chamber 20. The air retaining chamber 20 as defined is partially received in the same micropore 11 and is spaced apart from the air accommodating space 213 of the first cover film 21 received in the same micropore 11.

Similar to the first embodiment, at least one of the corresponding crest portions 212, 222 of the film sections 210, 220 of the first and second cover films 21, 22 may be formed with the through hole 216, 226 that has the pore size smaller than that of the same micropore 11 and that is in gas communication with the air retaining chambers 20 partially received in the same micropore 11.

In this embodiment, the structural configuration of the first and second cover films 21, 22 and the fabric sheet 1 enables the air retaining chambers 20 respectively and partially received in the micropores 11 to have a relatively large inner volume so as to retain a relatively large amount of air. Hence, the clothing made of the composite cloth 10 of the disclosure has an improved warmth retention property.

Specifically, when the composite cloth 10 of the second embodiment is made, the second cover film 22 including the film sections 220 is formed before being disposed on the top surface 13 of the fabric sheet 1. Thereafter, the second cover film 22 is melt-bonded to the top surface 13 of the fabric sheet 1.

Figure 5:
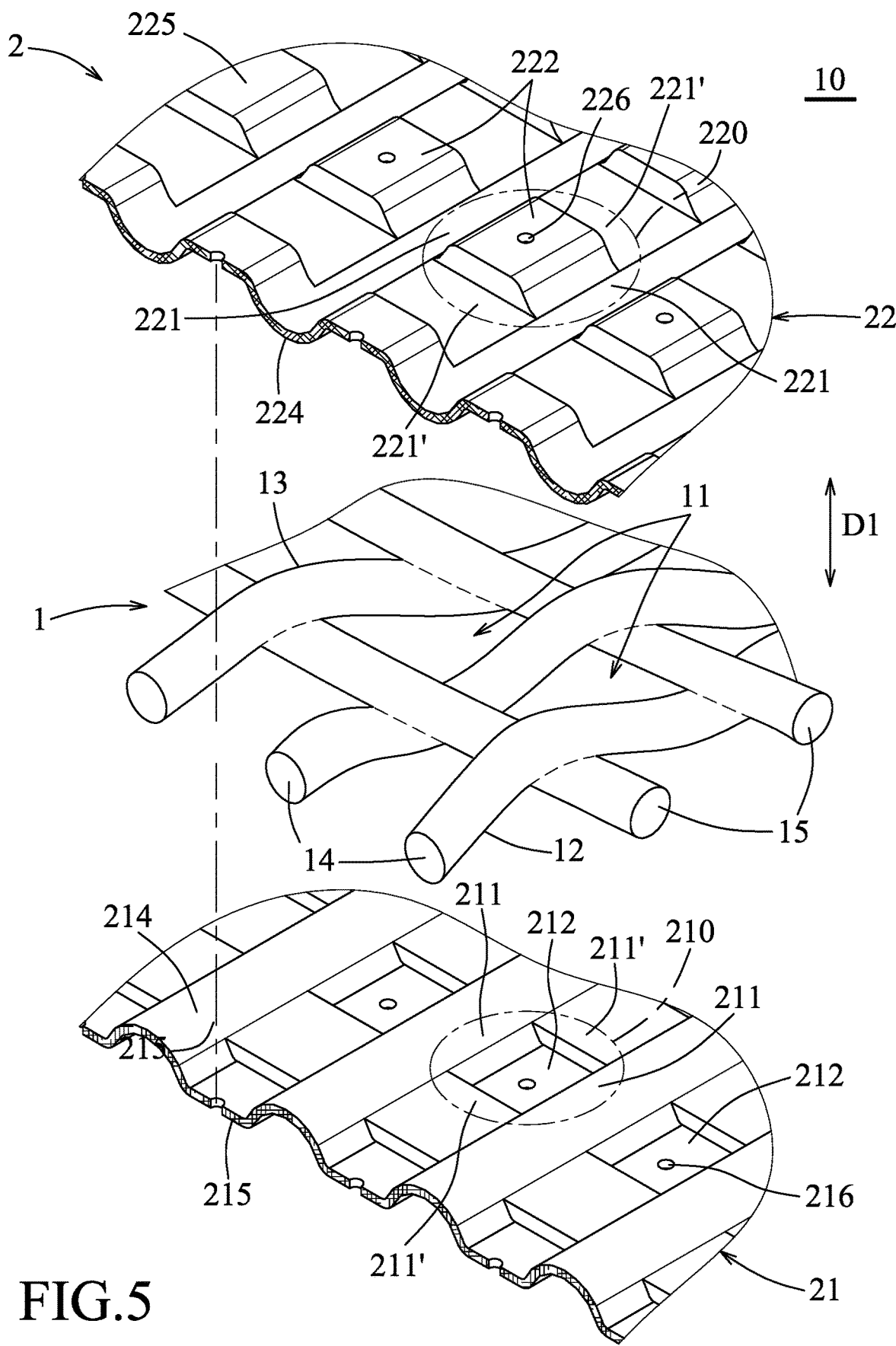
FIG. 5 is a fragmentary exploded view illustrating a third embodiment of the composite cloth according to the disclosure.
Figure 6:
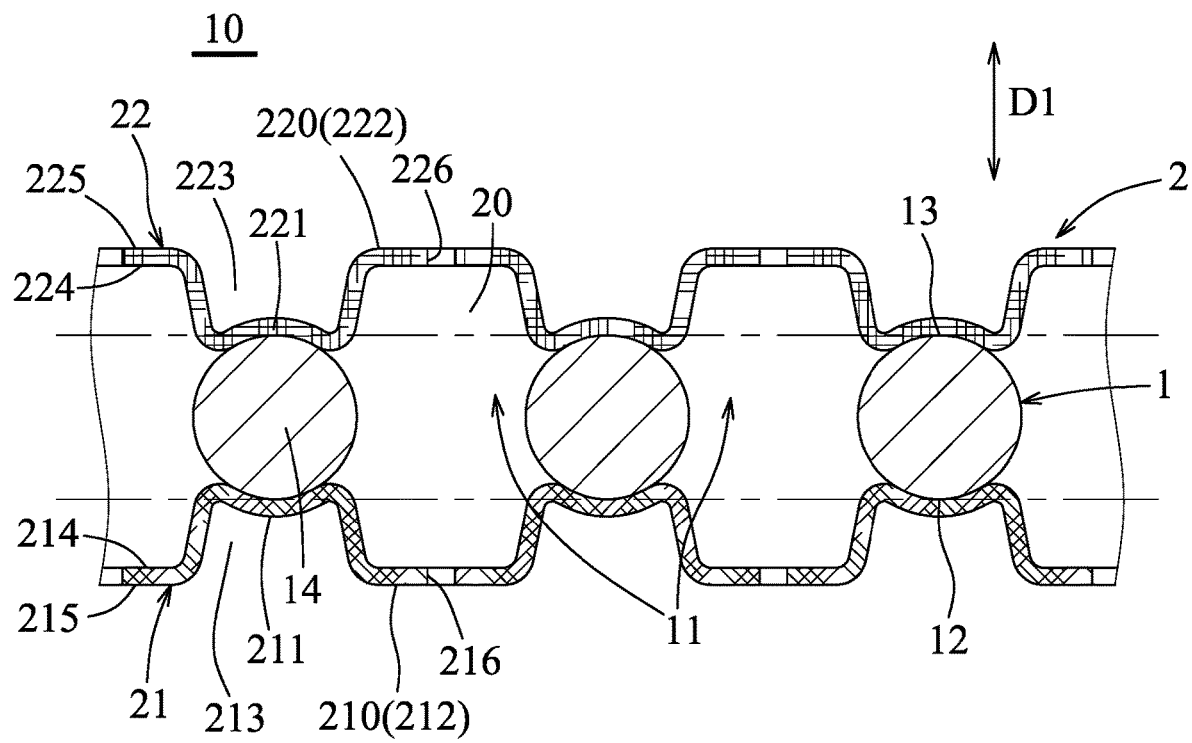
FIG. 6 is a fragmentary cross-sectional view illustrating the third embodiment.

Referring to FIGS. 5 and 6, a third embodiment of the composite fabric 10 according to the disclosure is illustrated. The fabric sheet 1 and the film unit 2 of the composite cloth 10 of the third embodiment have a configuration similar to that of the composite cloth 10 of the first embodiment. However, in the third embodiment, the film bottom surface 214 of the first cover film 21 is connected to the bottom surface 12 of the fabric sheet 1. The crest portion 212 of each of the film sections 210 of the first cover film 21 protrudes away from the bottom surface 12 of the fabric sheet 1 and corresponds in position to a corresponding one of the micropores 11. The air accommodating spaces 213 of the first cover film 2 are respectively misaligned with the micropores 11.

The film bottom surface 224 of the second cover film 22 is connected to the top surface 13 of the fabric sheet 1. The crest portion 222 of each of the film sections 220 of the second cover film 22 protrudes away from the top surface 13 of the fabric sheet 1 and corresponds in position to a corresponding one of the micropores 11. The air accommodating spaces 223 of the second cover film 22 are respectively misaligned with the micropores 11.

In this embodiment, a corresponding one of the crest portions 212 of the film sections 210 of the first cover film 21 and a corresponding one of the crest portions 222 of the film sections 220 of the second cover film 22, which correspond in position to a same one of the micropores 11, cooperate with the fabric sheet 1 to define an air retaining chamber 20. The air retaining chambers 20 are partially received in the same micropore 11.

Similar to the first embodiment, at least one of the corresponding crest portions 212, 222 of the film sections 210, 220 of the first and second cover films 21, 22 may be formed with the through holes 216, 226 that have the pore size smaller than that of the same micropore 11 and that are in gas communication with the air retaining chambers 20 partially received in the same micropore 11.

In this embodiment, the structural configuration of the first and second cover films 21, 22 and the fabric sheet 1 enables the air retaining chambers 20 respectively and partially received in the micropores 11 to have a much larger inner volume so as to retain a much larger amount of air. Hence, the clothing made of the composite cloth 10 of the disclosure has an improved warmth retention property.

To be specific, when the composite cloth 10 of this embodiment is made, the first and second cover films 21, 22 are formed before being respectively disposed on the bottom and top surfaces 12, 13 of the fabric sheet 1. Subsequently, the first and second cover films 21, 22 are respectively melt-bonded to the bottom and top surfaces 12, 13 of the fabric sheet 1.

Figure 7:
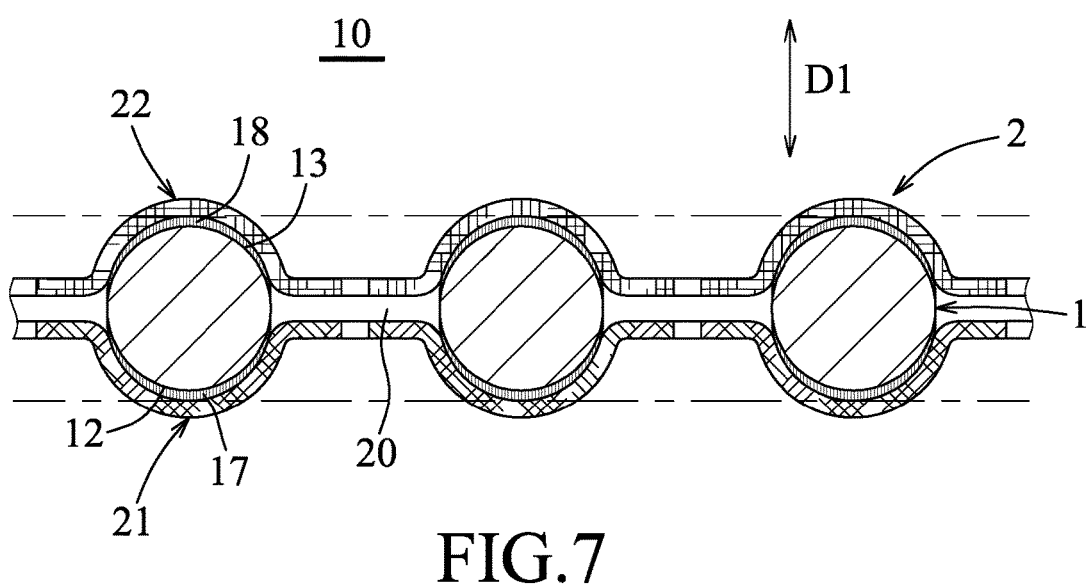
FIG. 7 is a fragmentary cross-sectional view illustrating a fourth embodiment of the composite cloth according to the disclosure.

Referring to FIG. 7, a fourth embodiment of the composite cloth 10 according to the disclosure is illustrated. The composite cloth 10 of the fourth embodiment has a configuration similar to that of the composite cloth 10 of the first embodiment. However, the fabric sheet 1 of the fourth embodiment is made of fleece fabric. Specifically, at least one of the top and bottom surfaces 13, 12 of the fabric sheet 1 is configured to be a fleece portion 17, 18. The fleece portions 17, 18 may be formed using fleece finishing techniques. By way of the design of the fleece portions 17, 18, a distance from the bottom surface 12 to the top surface 13 of the fabric sheet 1 is increased relative to the fabric sheet 1 free of the fleece portions 17, 18. The air retaining chambers 20 may have an increased inner volume. Therefore, a great amount of the air can be retained in the air retaining chambers 20.

To sum up, by virtue of the inclusion of the film sections 210, 220 of the first and second cover films 21, 22, the air-retaining property of the composite cloth 10 is improved. Consequently, the clothing made of the composite cloth 10 has an improved warmth retention property without an undesirable increase in weight or thickness.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A composite cloth, comprising:
   a fabric sheet having a bottom surface, a top surface opposite to said bottom surface, and a plurality of micropores extending through said bottom surface and said top surface; and
   a film unit including first and second cover films disposed on said bottom and top surfaces of said fabric sheet, respectively, each of said first and second cover films including a film bottom surface, a film top surface opposite to said film bottom surface and a plurality of film sections connected to each other and cooperatively defining said film bottom surface and said film top surface, each of said film sections including a pair of longitudinal trough portions, a pair of transverse trough portions connected between said longitudinal trough portions, and a crest portion surrounded by and protruding from said longitudinal and transverse trough portions along a direction from said film bottom surface to said film top surface of a corresponding one of said first and second cover films, said crest portion including a connecting part that is directly connected to the fabric sheet, and an extending part that extends from said connecting part along the direction from said film bottom surface to said film top surface, said longitudinal and transverse trough portions and said crest portions of said film sections cooperatively defining air accommodating spaces that are spaced apart from said fabric sheet,
   wherein said crest portion of each of said film sections of said first cover film corresponds in position to a corresponding one of said micropores, and said crest portion of each of said film sections of said second cover film corresponds in position to said corresponding one of said micropores, and
   wherein said extending part of at least one of said corresponding crest portions of said film sections of said first and second cover films is formed with a through hole that has a pore size smaller than that of said corresponding micropore.

2. The composite cloth of claim 1, wherein said film top surface of said first cover film is connected to said bottom surface of said fabric sheet, said crest portion of each of said film sections of said first cover film extending into said corresponding one of said micropores, said air accommodating spaces of said first cover film being respectively received in said micropores.

3. The composite cloth of claim 2, wherein said film top surface of said second cover film is connected to said top surface of said fabric sheet, said crest portion of each of said film sections of said second cover film extending into said corresponding one of said micropores, said air accommodating spaces of said second cover film being respectively received in said micropores.

4. The composite cloth of claim 3, wherein a corresponding one of said crest portions of said film sections of said first cover film and a corresponding one of said crest portions of said film sections of said second cover film, both of which extend into the same one of said micropores, cooperate with said fabric sheet to define an air retaining chamber in the same said micropore, said air retaining chamber being spaced apart from corresponding ones of said air accommodating spaces of said first and second films received in the same said micropore.

5. The composite cloth of claim 4, wherein said through hole is in gas communication with said air retaining chamber in the same said micropore.

6. The composite cloth of claim 2, wherein said film bottom surface of said second cover film is connected to said top surface of said fabric sheet, said crest portion of each of said film sections of said second cover film protruding away from said top surface of said fabric sheet and corresponding in position to said corresponding one of said micropores, said air accommodating spaces of said second cover film being respectively misaligned with said micropores.

7. The composite cloth of claim 6, wherein a corresponding one of said crest portions of said film sections of said first cover film and a corresponding one of said crest portions of said film sections of said second cover film, which correspond in position to a same one of said micropores, cooperate with said fabric sheet to define an air retaining chamber, said air retaining chamber being partially received in the same said micropore and being spaced apart from said air accommodating space of said first cover film received in the same said micropore.

8. The composite cloth of claim 7, wherein said through hole is in gas communication with said air retaining chambers partially received in the same said micropore.

9. The composite cloth of claim 1, wherein said film bottom surface of said first cover film is connected to said bottom surface of said fabric sheet, said crest portion of each of said film sections of said first cover film protruding away from said bottom surface of said fabric sheet and corresponding in position to said corresponding one of said micropores, said air accommodating spaces of said first cover film being respectively misaligned with said micropores.

10. The composite cloth of claim 9, wherein said film bottom surface of said second cover film is connected to said top surface of said fabric sheet, said crest portion of each of said film sections of said second cover film protruding away from said top surface of said fabric sheet and corresponding in position to said corresponding one of said micropores, said air accommodating spaces of said second cover film being respectively misaligned with said micropores.

11. The composite cloth of claim 10, wherein a corresponding one of said crest portions of said film sections of said first cover film and a corresponding one of said crest portions of said film sections of said second cover film, which correspond in position to a same one of said micropores, cooperate with said fabric sheet to define an air retaining chamber, said air retaining chamber being partially received in the same said micropore.

12. The composite cloth of claim 11, wherein said through hole is in gas communication with said air retaining chambers partially received in the same said micropore.

13. The composite cloth of claim 1, wherein said fabric sheet is made of one of a woven fabric and a nonwoven fabric.

14. The composite cloth of claim 13, wherein said fabric sheet is made of the woven fabric and includes a plurality of warp yarns and a plurality of weft yarns interlaced with each other to define said micropores thereamong.

15. The composite cloth of claim 1, wherein said first cover film and said second cover film of said film unit are made of a thermoplastic material selected from polyolefin, polyester, and a thermoplastic elastomer.

16. The composite cloth of claim 1, wherein said fabric sheet is made of fleece fabric.

17. The composite cloth of claim 16, wherein at least one of said top and bottom surfaces of said fabric sheet is configured to be a fleece portion.

18. The composite cloth of claim 1, wherein each of said longitudinal and transverse trough portions and said crest portions of each of said film sections of each of said first and second cover films has a cross section extending transverse to the direction and shaped into one of a tetragon and a semicircle.

* * * * *